United States Patent
Newberg et al.

(10) Patent No.: US 7,339,917 B2
(45) Date of Patent: Mar. 4, 2008

(54) METHOD FOR SELECTIVELY ALLOCATING A LIMITED NUMBER OF BITS TO SUPPORT MULTIPLE SIGNALING TYPES ON A LOW BIT RATE CHANNEL

(75) Inventors: Donald G. Newberg, Hoffman Estates, IL (US); Robert A. Biggs, Evanston, IL (US); Bradley M. Hiben, Glen Ellyn, IL (US); David L. Muri, Sunrise, FL (US); Darrell J. Stogner, Plantation, FL (US); Alan L. Wilson, Long Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/799,913

(22) Filed: Mar. 12, 2004

(65) Prior Publication Data

US 2004/0240465 A1 Dec. 2, 2004

Related U.S. Application Data

(60) Provisional application No. 60/474,533, filed on May 30, 2003.

(51) Int. Cl.
*H04J 3/00* (2006.01)
*H04B 7/212* (2006.01)

(52) U.S. Cl. .................. 370/345; 370/442; 370/509

(58) Field of Classification Search ............. 370/345, 370/347, 350, 442, 498, 503, 509, 512, 513, 370/514, 522, 528, 468, 477
See application file for complete search history.

(56) References Cited

U.S. PATENT DOCUMENTS

| 6,256,304 B1* | 7/2001 | Vayrynen ............... 370/350 |
|---|---|---|
| 6,292,484 B1* | 9/2001 | Oliver .................. 370/389 |
| RE37,494 E * | 1/2002 | Cantoni et al. ........ 370/395.6 |
| 6,714,557 B1* | 3/2004 | Smith et al. ........... 370/442 |
| 2003/0061558 A1* | 3/2003 | Fackenthal et al. ..... 714/755 |
| 2003/0193963 A1* | 10/2003 | Wright et al. ......... 370/442 |
| 2004/0083393 A1* | 4/2004 | Jordan et al. .......... 713/202 |

OTHER PUBLICATIONS

Project 25 FDMA Common Air Interface; SP-3-4080 to be published as TIA/EIA 102.BAAA Draft Revision K; Sep. 6, 2002 prepared by Motorola, Inc.

* cited by examiner

*Primary Examiner*—Daniel J. Ryman
(74) *Attorney, Agent, or Firm*—Terri S. Hughes; Valerie M. Davis (57) ABSTRACT

In a wireless communication system with an air interface comprising a plurality of bursts, a plurality of bursts is defined. Each burst comprises a field (300) embedded within the burst. The field is one of a synchronization field (300') and a signaling field (300"). When the field is a synchronization field, a position of at least one subsequent burst comprising the signaling field is defined, and a position of at least one subsequent burst comprising the synchronization field is defined.

19 Claims, 8 Drawing Sheets

METHOD FOR SELECTIVELY ALLOCATING A LIMITED NUMBER OF BITS TO SUPPORT MULTIPLE SIGNALING TYPES ON A LOW BIT RATE CHANNEL

REFERENCE TO RELATED APPLICATIONS

The present application is related to the following U.S. application commonly owned together with this application by Motorola, Inc.: Ser. No. 60/474,533 filed May 30, 2003, titled "Method for Selecting an Operating Mode based on a Detected Synchronization Pattern" by Hiben et al.

FIELD OF THE INVENTION

The present invention relates generally to method for selectively allocating a limited number of bits to support multiple signaling types on a low bit rate channel.

BACKGROUND OF THE INVENTION

As the voice coding technology matures (i.e., the ability to encode voice with a fewer number of bits), the ability for a wireless communication system to carry at least one additional voice path on a radio frequency ("RF") communication path is desired. Due to the limited amount of RF spectrum available, there is an interest to take advantage of the improved voice coding technology in order to support the additional voice call(s) on the existing channel while still maintaining the existing RF modulation scheme, and the existing functionality of the system.

A disadvantage of supporting the additional voice call(s) on the existing channel is the reduction of the number of bits available for voice and signaling in each call. The reduction in the number of bits required to carry a voice session, however, does not wholly address the problem. Since voice communication paths also convey signaling and framing information, as the number of voice paths per RF channel increase, so does the need for additional signaling and framing information. Increasing the bit rate of the RF communication channel is not always possible as communication bandwidth or range will suffer.

Figure 1:
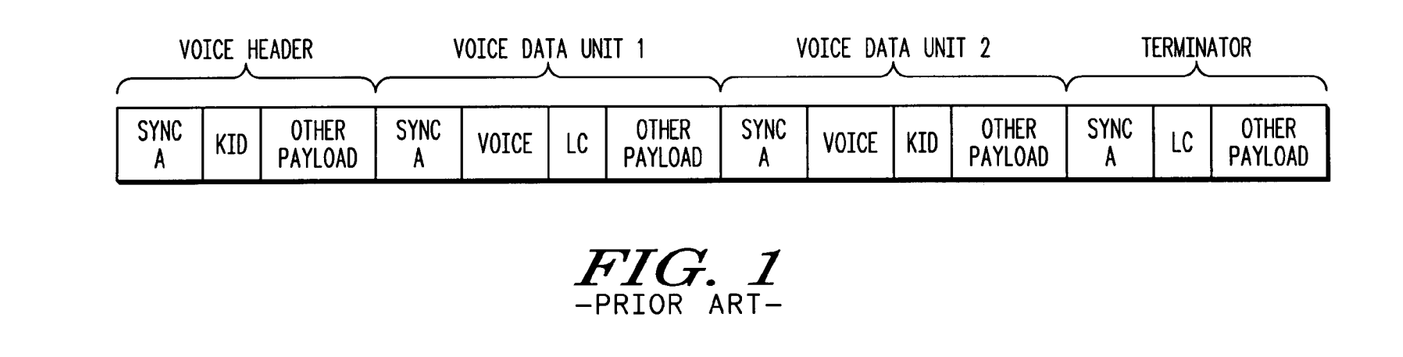
FIG. 1 (prior art) illustrates a FDMA air interface.

FIG. 1 illustrates an existing communication protocol that supports a single voice path per channel; frequency division multiple access ("FDMA") technology is a common solution to support a single voice path per channel. Systems utilizing this protocol have a sufficient number of bits available to dedicate fields for each type of signaling, such as synchronization signaling, link control signaling, and/or the like.

Figure 2:
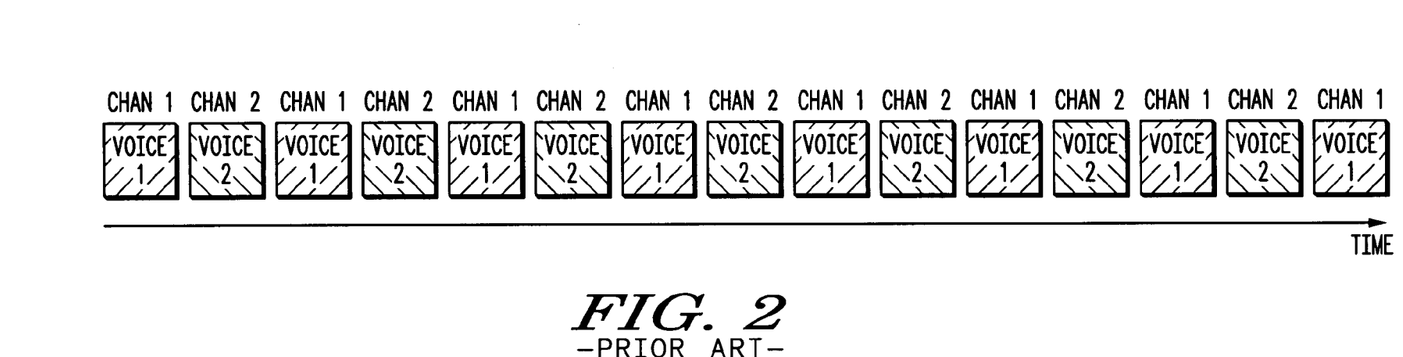
FIG. 2 (prior art) illustrates a TDMA air interface.

As illustrated in FIG. 2, the existing channel may be divided into two or more voice paths, each supporting an independent voice call; time division multiple access ("TDMA") technology is an attractive solution to divide the existing channel into two or more voice paths. Although FIGS. 1 and 2 show a conversion from FDMA to TDMA, converting any access technology to another is applicable.

Thus, there exists a need for a method of selectively allocating a limited number of bits to support multiple signaling types on a low bit rate channel.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention uses a single embedded field in a burst structure as either a synchronization field or a signaling field to maximize the utility of a limited number of bits in each burst. The present invention uses a superframe structure to define whether the single embedded field in the burst is used as a synchronization field to enable the receiving device to determine the center of a burst, or a signaling field to enable the receiving device to receive payload. The present invention uses the embedded field as a synchronization field every nth burst that marks the beginning and end of the superframe; the embedded field is used as a signaling field in all other bursts of the superframe. It should be noted that voice calls typically end on a superframe boundary, which minimizes the processing burden on the receiving device. Optionally, the present invention may use the synchronization field to enable the receiving device to, in addition to determining the center of the burst, differentiate between voice bursts and non-voice bursts, differentiate between inbound signaling and outbound signaling, and/or differentiate between a first air interface type and a second air interface type. Let us now turn to the figures to describe the present invention in further detail.

Figure 3:
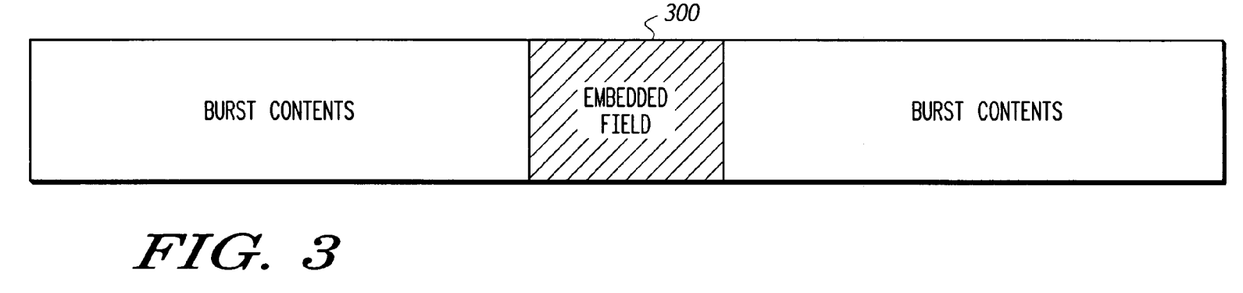
FIG. 3 illustrates a TDMA burst format having an embedded field in accordance with the present invention.
Figure 4:
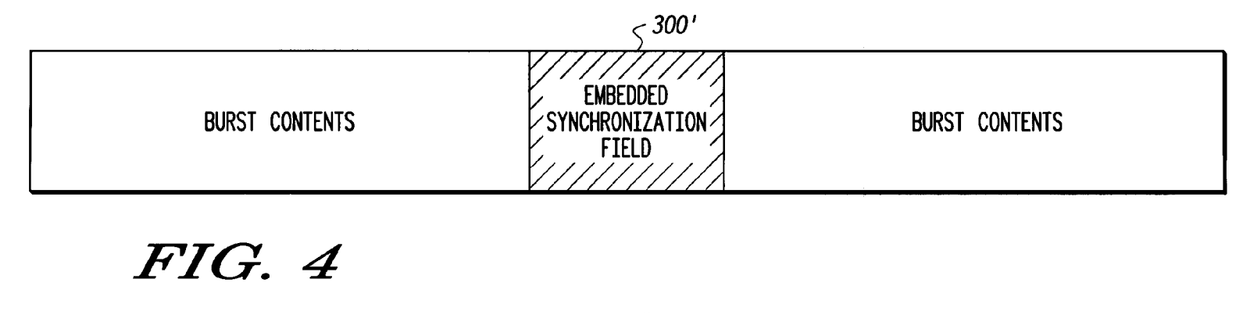
FIG. 4 illustrates the TDMA burst format of FIG. 3, wherein the embedded field is a synchronization field in accordance with the present invention.
Figure 5:
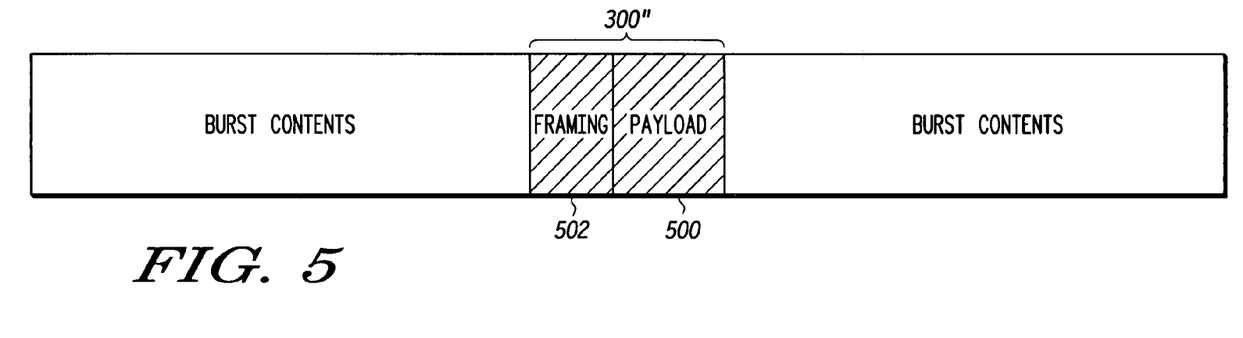
FIG. 5 illustrates the TDMA burst format of FIG. 3, wherein the embedded field is a signaling field in accordance with the present invention.

When the number of bits available in a single burst is insufficient to provide dedicated fields for both embedded synchronization and embedded signaling, the present invention defines a burst structure having a single embedded field 300 that is able to support either synchronization or signaling as needed, as generally illustrated in FIG. 3; specifically, FIG. 4 illustrates the embedded field being used as a synchronization field 300', and FIG. 5 illustrates the embedded field being used as a signaling field 300" comprising payload 500 and framing for the payload 502. The burst contents can be of any type, such as, voice, data, or control. It should be noted that even though FIGS. 3-5 position the embedded field 300 in the center of the burst, the embedded field 300 can be positioned anywhere within the burst.

Figure 6:
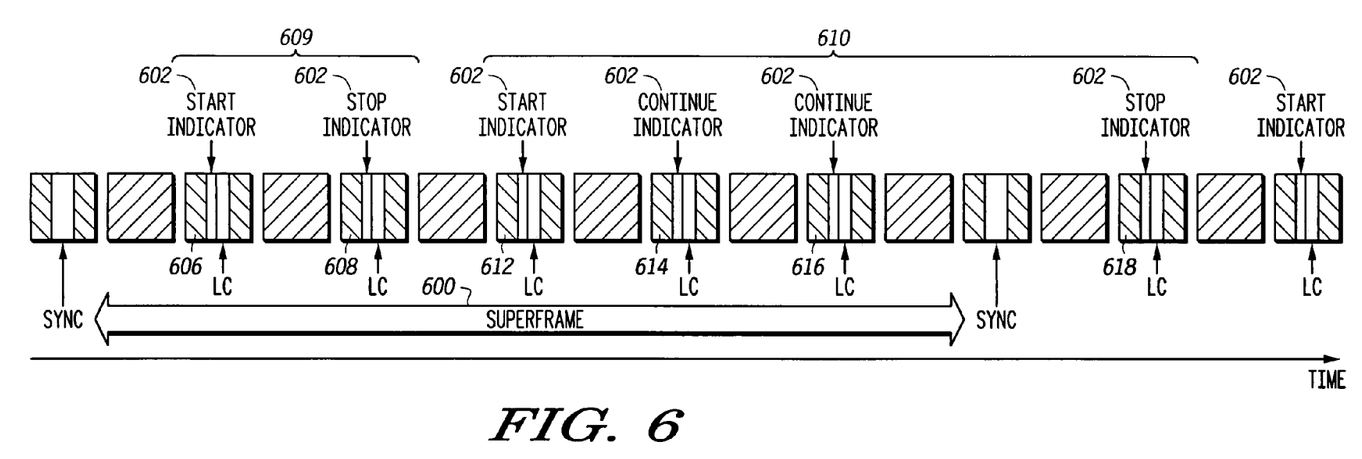
FIG. 6 illustrates an example of a superframe timing-diagram comprising variable length packets in accordance with the present invention.

Referring now to FIG. 6, for ease of explanation, it is assumed that the burst contents comprise voice. During a voice call, synchronization is transmitted periodically (e.g., every nth burst) in the embedded field 300' to define the boundaries of a superframe 600. Signaling is transmitted in the embedded field 300" of the remaining bursts in the superframe 600.

As noted above in FIG. 5, the signaling in the embedded field 600 is preferably divided into two portions: a framing portion 502 and a payload portion 500. In the preferred embodiment of the present invention, the framing portion 502 of the embedded signaling field 300" comprise an indicator 602 to mark at least the beginning and the end of a variable length packet. Such an indicator 602 allows the receiving device to determine the boundaries of a packet when variable length packets are transmitted over the channel 100. As illustrated in FIG. 6, for example, the first packet 604 requires two bursts 606, 608 to be transported over the channel 100, and the second packet 610 requires four bursts 612, 614, 616, 618 to be transported over the channel 100; FIG. 6 further illustrates how the indicators 602 mark at least the beginning and the end of each packet. It should be noted, as illustrated in the figures, that a packet does not necessarily have to begin and end within a single superframe 600.

Figure 7:
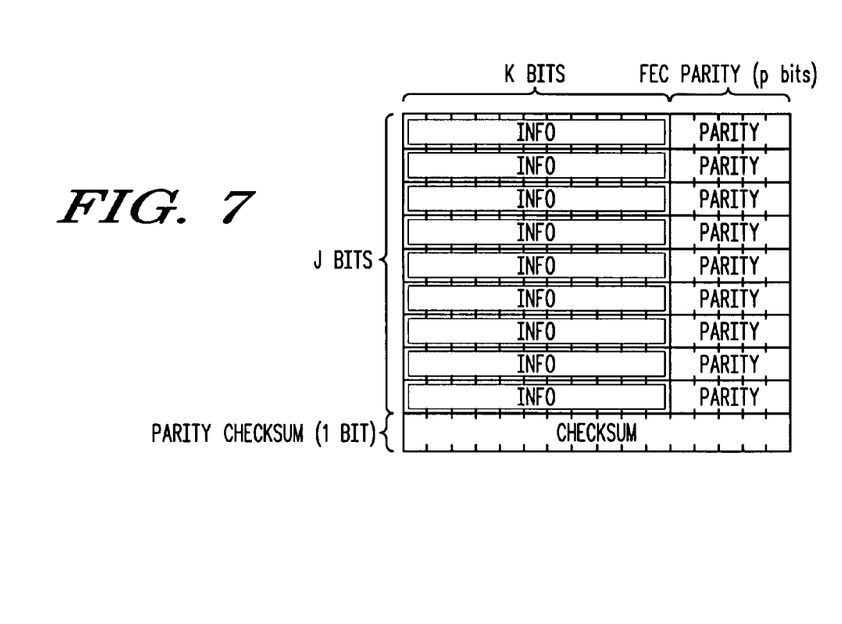
FIG. 7 illustrates an example of arranging the variable length packet information into a j,x,k matrix in accordance with the present invention.
Figure 8:
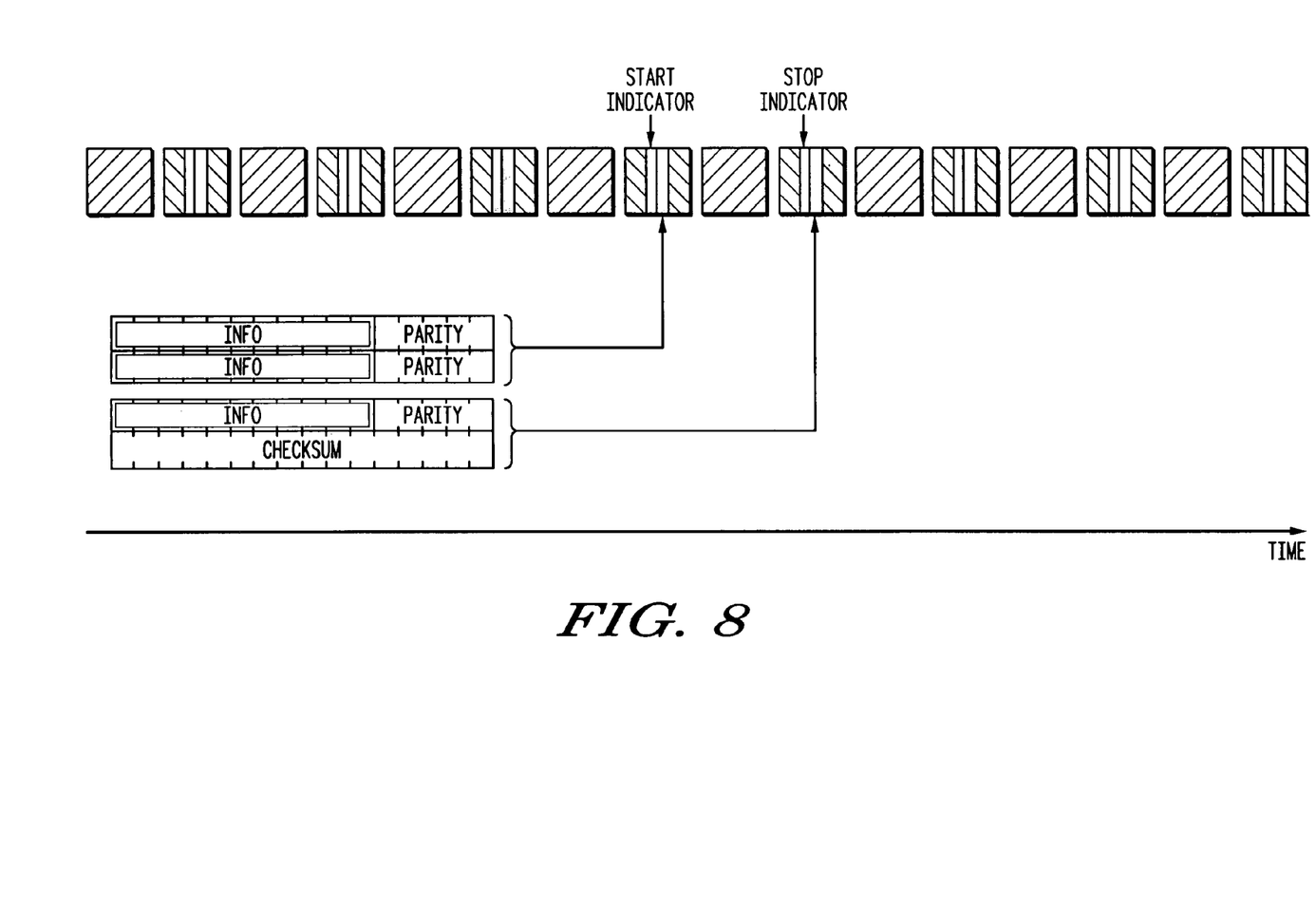
FIG. 8 illustrates an example of a variable length packet that can fit into a payload portion of two burst in accordance with the present invention.
Figure 9:
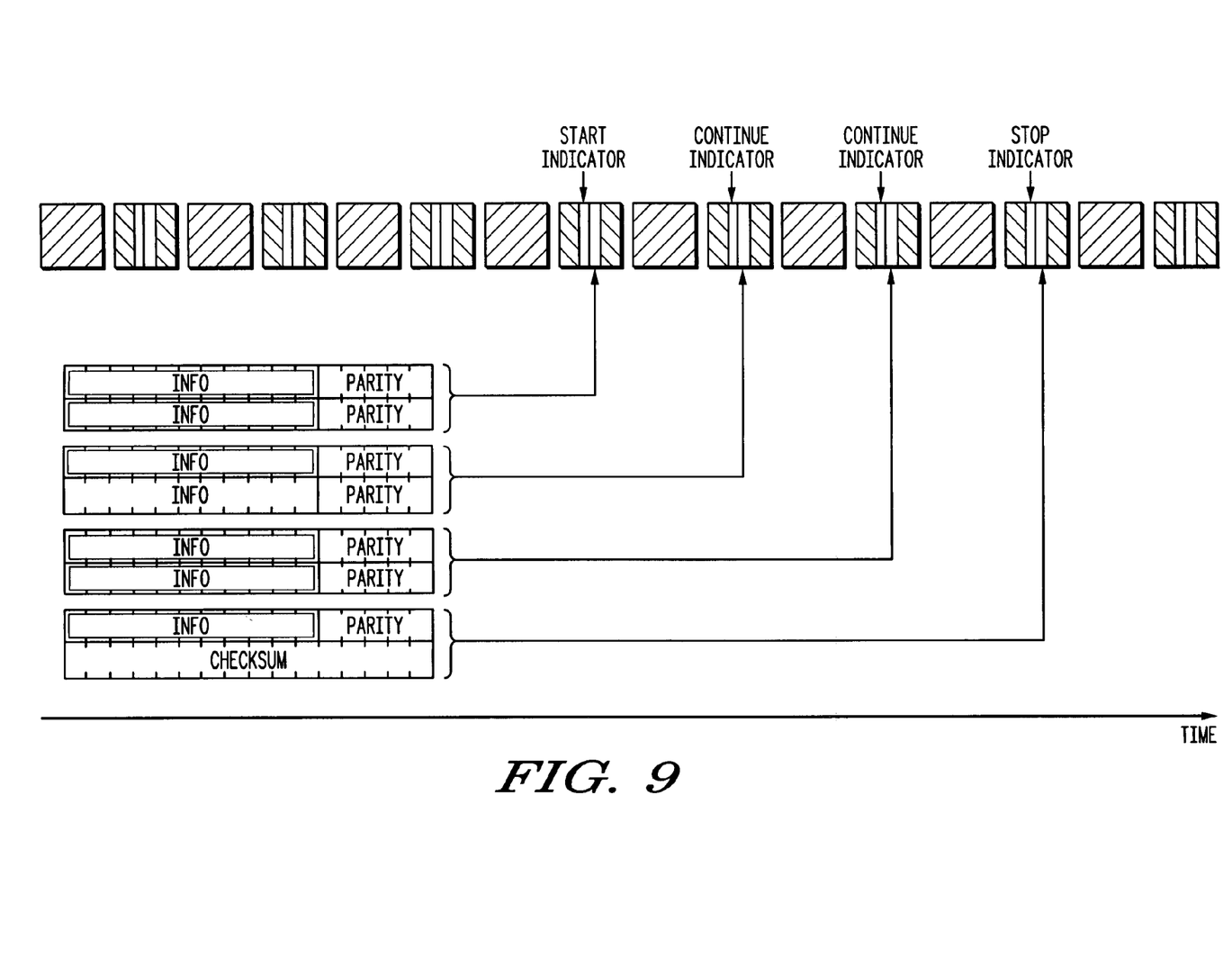
FIG. 9 illustrates an example of a variable length packet that requires the payload portion of four separate burst in accordance with the present invention.

For simplicity of implementation, it is desired to have a single forward error correction (FEC) decoding algorithm that can process any length of the variable length packet. This can be accomplished by arranging the variable length packet information into a j, x, k matrix as illustrated in FIG. 7. Each row of the matrix is FEC encoded using a block code (e.g., a Hamming (16,11)), with the resulting p parity bits added to the end of each row. An additional row of parity checksum bits is placed at the bottom of the resulting matrix, where the parity is calculated on each column of the matrix. This arrangement of row and column codes allows the information to be decoded iteratively, using both the rows and columns for addition coding gain. The number of columns of the resulting matrix is fixed and is a function of the block code used. Given the nature of a parity bit calculation, the number of rows can be variable without changing the nature of the decoding algorithm, thus allowing a single decoder to process a variable length field. After encoding, the information and parity are fragmented such that each fragment can be carried in the payload portion of a burst. FIG. 8 illustrates a variable length packet that can fit into the payload portion of two bursts. FIG. 9 illustrates a variable length packet that requires the payload portion of four separate bursts.

Figure 10:
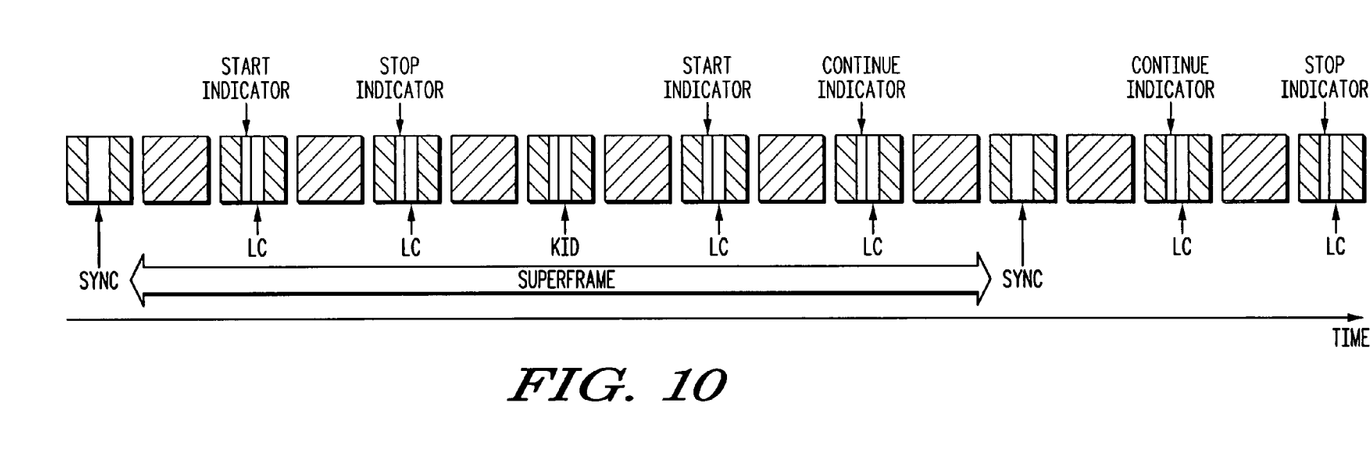
FIG. 10 illustrates an example of the superframe timing-diagram of FIG. 6 modified to comprise a key identifier in accordance with the present invention.

Typically, a first type of information, such as link control ("LC") signaling, and information used to frame the first type of information is carried in the plurality of bursts comprising the embedded signaling field in the superframe. The present invention, however, is capable of carrying at least a second type of information in at least one of the bursts comprising the embedded signaling field in the superframe while still maintaining the framing for the first type of information. When the second type of information is present in the superframe, the receiving device knows a priori the location of the burst(s), with respect to the superframe, carrying the embedded signaling field having the second type of information; typically the location of the burst(s) comprising the second type of information is the same in each superframe. As such, the receiving device frames the payload in each burst comprising the embedded signaling field, and processes the payload as a first type of information, except for those bursts known a priori by the receiving device to contain payload of the second type of information, in which the receiving device processes accordingly. For example, as illustrated in FIG. 10, the first type of information is link control signaling, and the second type of information is an encryption parameter (e.g., a key identifier (KID), an algorithm identifier (ALGID), or the like). Similar to FIG. 6, the second packet still requires four bursts to be transported over the channel as illustrated in FIG. 10; however, additional time is required to complete the transmission of the second packet in FIG. 10 since one of the bursts is used for transporting the second type of information.

Figure 11:
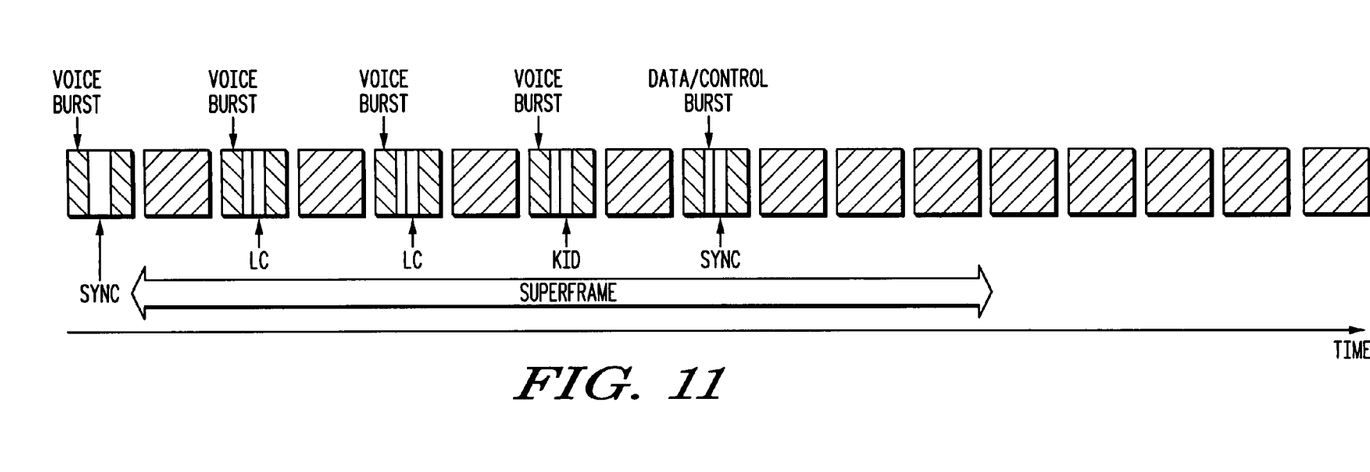
FIG. 11 illustrates an example of a voice call terminating on a non-superframe boundary in accordance with the present invention.

Continuing with the example of voice calls, voice calls are typically ended on superframe boundaries in order to minimize the processing power on the receiving device; in other words, the receiving device only has to analyze the first burst in each superframe, as opposed to analyzing every burst in the superframe, to verify whether voice is present in the burst (i.e., to determines whether the voice call has ended). It should be noted, however, that it is possible to end the voice call prior to the end of the superframe by transmitting data and/or control in accordance with the present invention. As illustrated in FIG. 11, the superframe comprises a plurality of bursts; wherein the first burst indicates the start of the current superframe as described above. In this example, early termination of the voice call is signaled by the presence of a non-voice burst (in this case, the fifth burst on the channel) prior to the end of the superframe. The non-voice burst comprises an embedded synchronization field, and the synchronization pattern embedded in the non-voice burst is preferably differentiated from the synchronization patterns embedded in voice bursts indicating the beginning and ending of the superframe, however the present invention is not limited to differentiating the synchronization patterns.

At this point, the foregoing description described how the present invention uses a single embedded field in a burst structure as either the synchronization field or the signaling field to maximize the utility of the limited number of bits in each burst; how the present invention uses the embedded signaling field to carry at least two types of information in a single superframe while maintaining the framing for the first type of information; and how the present invention allows a voice call to end on a non-superframe boundary. The following description will now describe how the present invention uses the synchronization field to further enable the receiving device to set its operating parameters to differentiate between, for example, voice bursts and non-voice bursts, inbound signaling and outbound signaling, and/or a first air interface type and a second air interface type. Let us now refer to FIGS. 12 and 13 in detail.

Figure 12:
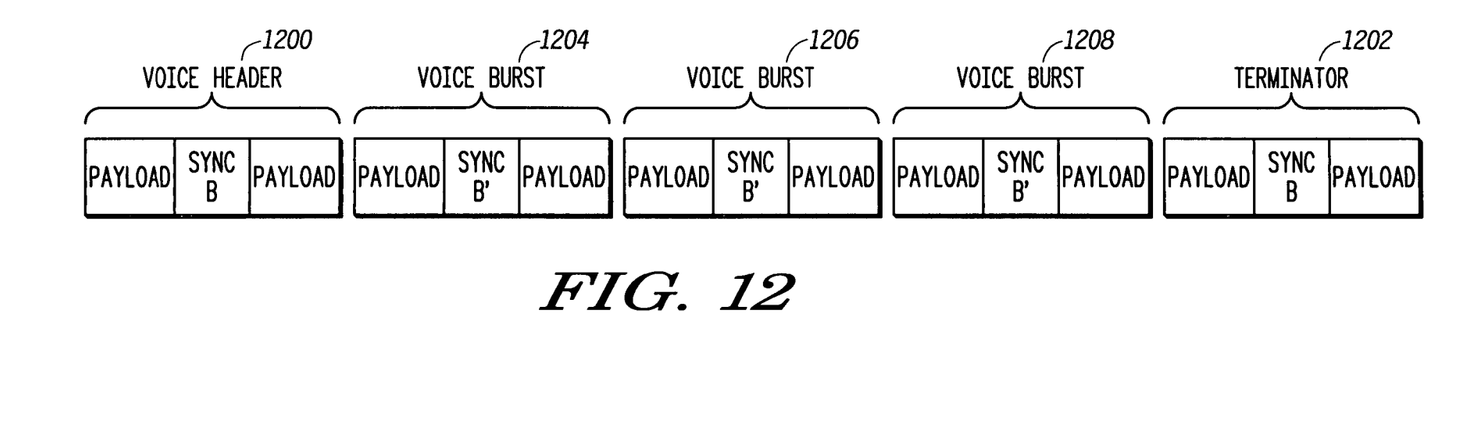
FIG. 12 illustrates an example of differentiating between voice burst and non-voice bursts based on the synchronization pattern in accordance with the present invention.

As noted above, synchronization is typically achieved by matching a received synchronization pattern against an expected synchronization pattern. The present invention uses multiple synchronization patterns to signal the selection of various operating parameters. In a first example, the embedded synchronization field 300' is used to enable the receiving device to differentiate between voice burst and non-voice bursts in accordance with the present invention. The present invention assumes that the burst structure of each voice burst and each non-voice burst utilize the same embedded synchronization field 300' illustrated in FIG. 4 even though the burst content is quite different between the two. To avoid using dedicated bits to differentiate between a voice burst and a non-voice burst, the present invention utilizes different synchronization patterns such that the receiving device can utilize pattern matching to differentiate voice bursts from non-voice bursts. Preferably, the synchronization pattern used for the voice burst and the synchronization pattern used for the non-voice burst are complements of each other (for example, but not limited to, the bits/symbols of the synchronization pattern used for the voice bursts have the opposite polarity of the bits/symbols of the synchronization pattern used for the non-voice bursts), thus allowing the receiving device to utilize a single pattern-matching algorithm to detect both synchronization patterns, however the present invention is not limited to such. For example, as illustrated in FIG. 12, the non-voice bursts (the voice header and the terminator) 1200, 1202 use synchronization pattern B, while the voice bursts 1204, 1206, 1208 use the complement, synchronization pattern B'. Further to this example, in one implementation (for instance) the synchronization patterns have a common length, and one of the synchronization patterns is defined by a synchronization pattern defined in ANSI.102.BAAA (2003).

Figure 13:
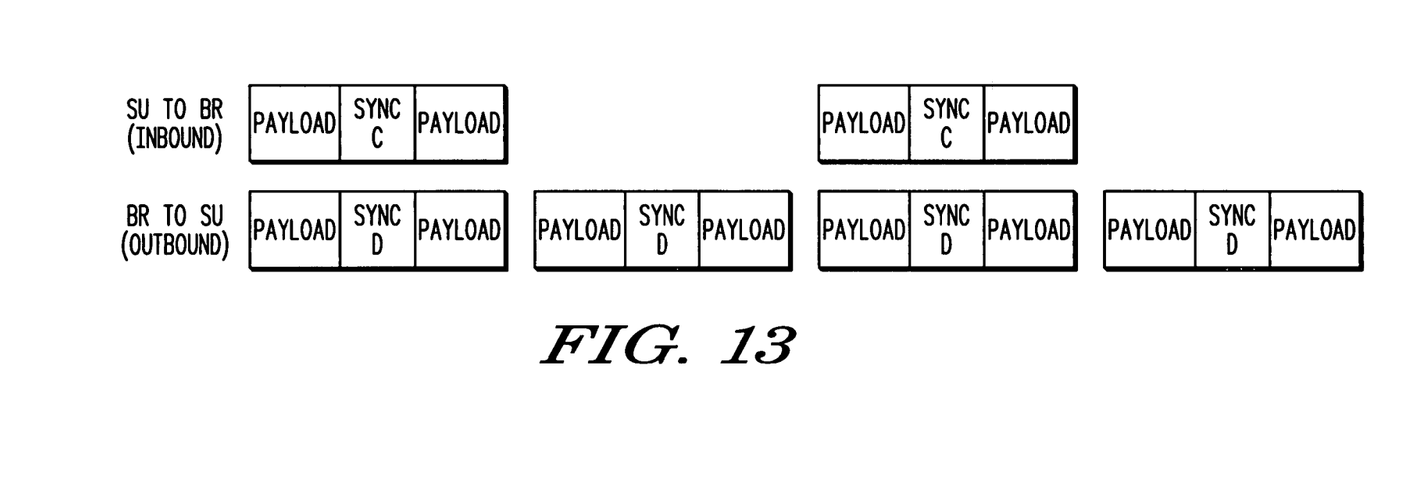
FIG. 13 illustrates an example of differentiating between inbound signaling and outbound signaling based on the synchronization pattern in accordance with the present invention.

In a second example, the embedded synchronization field 300' is used to enable the receiving device to differentiate between inbound signaling and outbound signaling in order to reject spurious signals from other systems or devices in accordance with the present invention. Again, the present invention assumes that the burst structure of each burst utilize the same embedded synchronization field 300' illustrated in FIG. 4. As illustrated in FIG. 13, the bursts being transmitted inbound (i.e., from the subscriber unit to the base radio) use a different synchronization pattern in the embedded synchronization field than bursts being transmitted outbound (i.e., from the base radio to the subscriber unit) in accordance with the present invention; in other words, inbound bursts use synchronization pattern C while outbound bursts use synchronization pattern D. Preferably, these synchronization patterns are highly uncorrelated such that a receiving device expecting an inbound transmission will not detect an outbound transmission from another device and/or system, and vice versa.

In yet a third example, the embedded synchronization field 300' is used to enable the receiving device to differentiate between different air interface types in accordance with the present invention. Differentiating between different air interfaces allows the receiving device to select the appropriate operating parameters (such as modulation type, frame/burst formats, bandwidth, or the like) for the given air interface. In the present invention, each air interface type has a different synchronization pattern associated therewith; for example, FIG. 1 illustrates a first air interface type (e.g., FDMA) having synchronization pattern A associated therewith, and FIG. 12 illustrates a second air interface type (e.g., TDMA) having synchronization pattern B associated therewith. Preferably, these synchronization patterns are highly uncorrelated in order to maximize the likelihood of the receiving device differentiating a first air interface from a second air interface. In this embodiment, the receiving device compares the received synchronization pattern to the two expected synchronizations patterns; it should be noted that the number of expected synchronization patterns in which the receiving device compares against the received synchronization pattern is dependent on the number of different air interface types available to the receiving device; the expected synchronization pattern that is substantially similar to the received synchronization pattern identifies which air interface type is being used, and enables the receiving device to set its operating parameter accordingly.

Figure 14:
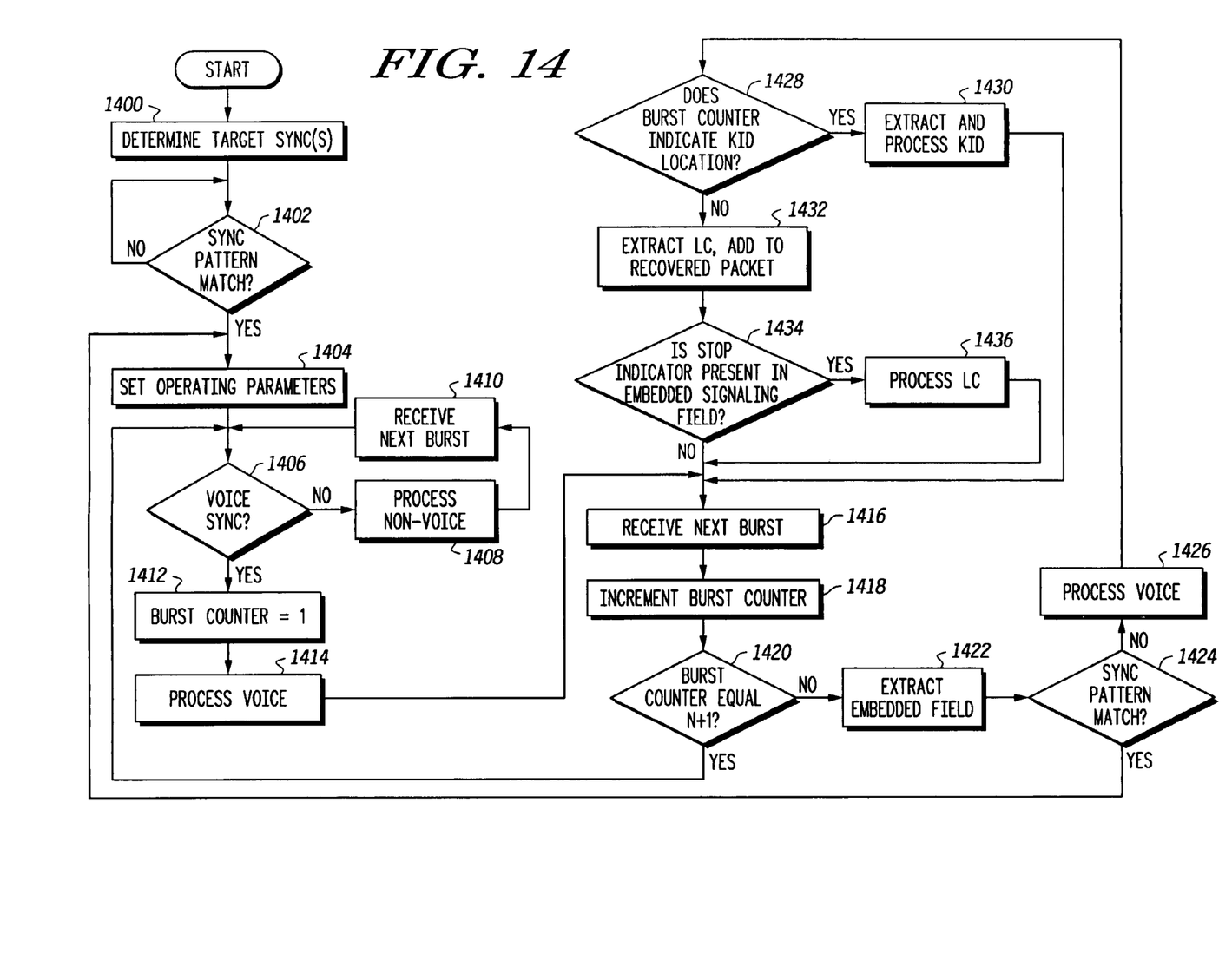
FIG. 14 illustrates a flowchart of the operation of the receiving device in accordance with the present invention.

Referring to FIG. 14, let us now discuss an example of the operation flow of the receiving device in accordance with the present invention. The example operation flow illustrated in FIG. 14 assumes that there are two types of information being transported in the embedded signaling field as described in FIG. 10: link control signaling, and the encryption parameter. Further, the present invention assumes that embedded synchronization field enables the receiving device to determine the center of a burst, to differentiate between multiple air interface types, and to differentiate between voice bursts and non-voice bursts, as described with respect to FIG. 12.

As illustrated, when the receiving device needs to acquire a channel (e.g., upon power-up, upon handoff, etc.), it determines a target synchronization pattern(s) to search for on the channel (at step 1400). The target synchronization pattern may be determined based on an expected operating mode, such as the expectation of one of an inbound channel, outbound channel, forward channel, reverse channel, subscriber transmission, base station transmission, repeated transmission, and non-repeated transmission. Alternatively, multiple target synchronization patterns may be determined based on multiple expected operating modes, such as TDMA versus FDMA. Once the target synchronization pattern is determined, the receiving device performs a pattern-matching algorithm on the channel until the target synchronization pattern is matched as known to those individuals ordinarily skilled in the art (at step 1402).

Once the target synchronization pattern is matched, the receiving device sets its operating parameters (and possibly its operating mode) based on the target synchronization pattern, and its timing information (at step 1404). The operating parameters and mode may be, but are not limited to, gain compensation, frequency offset compensation, timing information, format of the particular air interface, or the like.

At this point, the receiving device determines the type of contents of the burst (e.g., voice burst, non-voice burst, etc.) based on the synchronization pattern (at step 1406). When the synchronization pattern indicates that the contents of the burst are non-voice, the receiving device processes the non-voice information (at step 1408). The receiving device determines the type and processes the contents of subsequent bursts based on the synchronization pattern until a voice burst is detected (at steps 1408 and 1406).

When the synchronization pattern indicates that the contents of the burst are voice (at step 1406), the receiving device initializes a burst counter to represent the start of the superframe (at step 1412), and processes the voice (at step 1414). The receiving device knows a priori the number of bursts, N, that comprise the superframe. Upon receipt of each subsequent burst (at step 1416), the burst counter is incremented to indicate the location of the current burst relative to the superframe (at step 1418). Each time the burst counter is incremented, the receiving device determines whether the current burst indicates the start of a new superframe (at step 1420). If the current burst does indicate the start of a new superframe (i.e., if the burst counter equals N+1), the receiving device repeats the above process starting at step 1406 to determine whether the voice call has ended, and process the burst accordingly.

If the current burst does not indicate the start of a new superframe (i.e., if the burst counter is less than N+1), the receiving device extracts the bit pattern from the embedded field (at step 1422) and attempts to match the extracted bit pattern to the at least the one target synchronization pattern (at step 1424).

If the extracted bit pattern is substantially similar to one of the target synchronization patterns, the receiving device assumes that the voice call has ended on a non-superframe boundary and repeats the above process starting at step 1404 to set the operating parameters (and possibly its operating mode) based on the target synchronization pattern which was substantially similar to the extracted bit pattern from the current burst. If the extracted bit pattern is not substantially similar to one of the target synchronization patterns, the receiving device assumes the current burst is a voice burst and processes the voice accordingly (at step 1426).

Once the voice is processed, since the receiving device knows the location of the burst(s) comprising the second type of information, the receiving device determines whether the embedded signaling field comprises LC signaling (i.e., the first type of information) or the encryption parameter (i.e., the second type of information) based on the value of the burst counter (at step 1428). If the burst counter indicates that the current burst comprises the encryption parameter, the receiving device extracts the encryption parameter from the embedded signaling field and processes the encryption parameter accordingly (at step 1430). If the burst counter indicates that the current burst comprises LC signaling, the receiving device extracts the LC signaling from the embedded signaling field, and adds the LC signaling to the recovered packet in memory (at step 1432). The receiving device further determines whether the indicator 602 in the framing portion 502 of the embedded signaling field 300" indicates that the current burst completes the entire packet; in other words that the entire packet has been recovered (at step 1434). If the entire packet has been recovered, the receiving device processes the recovered packet accordingly (at step 1436) and clears the memory in anticipation of the next LC signaling. If the entire packet, however, has not been recovered, the receiving device awaits the next burst and repeats the above process starting at step 1416.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a wireless communication system with an air interface, a method comprising:
   receiving a plurality of bursts comprising a superframe, wherein each burst comprises a field embedded within a fixed location in the burst, the field is one of a synchronization field and a signaling field, the field is the synchronization field in a first burst of the plurality of bursts in the superframe and the field is the signaling field in a remainder of the plurality of bursts in the superframe;
   for each burst in the superframe, determining whether the field is the synchronization field or the signaling field;
   when the field is the synchronization field, defining a position of at least one subsequent burst comprising the signaling field, and defining a position of at least one subsequent burst comprising a synchronization field; and
   when the field is the signaling field, defining an indicator in a framing portion of the signaling field to identify that payload in the burst is one of a) begins a new packet, b) completes a packet, and c) does not begin or complete a packet.

2. The method of claim 1 wherein the signaling field carries non-voice information.

3. The method of claim 1 wherein each burst comprising the signaling field comprises one of a link control signaling, and an encryption parameter.

4. The method of claim 1 wherein at least one burst comprising the signaling field carries link control signaling.

5. The method of claim 4 wherein the link control signaling is formed into a matrix, having rows and columns, prior to forward error correction encoding, wherein the rows of the matrix are encoded with a block code, and wherein the columns of the matrix are encoded with a parity checksum.

6. The method of claim 5 wherein the block code is a Hamming(16, 11) code.

7. The method of claim 1 wherein an encryption parameter is carried in one of the bursts comprising the signaling field, and wherein a receiving device of the plurality of bursts knows a location of the burst carrying the encryption parameter a priori.

8. In a wireless communication system with an air interface, a method comprising the steps of:
   receiving a burst comprising a payload and a field embedded within the burst;
   determining whether the field is one of a synchronization field and a signaling field wherein the synchronization field comprises a synchronization pattern; and
   when the field is determined to be the synchronization field:
      identifying a position of at least one subsequent burst comprising the signaling field;
      identifying at least one subsequent burst comprising the synchronization field;
      comparing the received synchronization pattern against a first known synchronization pattern and a second known synchronization pattern;
      if the received synchronization pattern matches the first known synchronization pattern, processing the payload as voice; and
      if the received synchronization pattern matches the second known synchronization pattern, processing the payload as non-voice.

9. The method of claim 8 wherein the first known synchronization pattern and the second known synchronization pattern are complements of each other.

10. The method of claim 8 wherein at least one burst comprising the signaling field carries link control signaling and framing information for the link control signaling.

11. The method of claim 10 wherein an encryption parameter is carried in one of the bursts comprising the signaling field, and wherein a receiving device of the plurality of bursts knows a location of the burst carrying the encryption parameter a priori.

12. The method of claim 8 wherein an encryption parameter is carried in one of the bursts comprising the signaling field, and wherein a receiving device of the plurality of bursts knows a location of the burst carrying the encryption parameter a priori.

13. The method of claim 8 further comprising the steps of:
when a burst comprising the synchronization field is expected to be received, comparing a pattern in the synchronization field against a known synchronization pattern, and
if the pattern in the synchronization field matches the known synchronization pattern, setting at least one of a set of operating parameters and an operating mode based on the known synchronization pattern.

14. In a wireless communication system with an air interface, a method comprising the steps of:
receiving a burst comprising a payload and a field embedded within the burst;
determining whether the field is one of a synchronization field and a signaling field wherein the synchronization field comprises a synchronization pattern;
when the field is determined to be the synchronization field:
identifying a position of at least one subsequent burst comprising the signaling field;
identifying at least one subsequent burst comprising the synchronization field;
selecting a target synchronization pattern dependent on an operating mode, wherein the target synchronization pattern is at least one of a first known synchronization pattern and a second known synchronization pattern;
comparing the received synchronization pattern against the target synchronization pattern; and
if the received synchronization pattern matches the target synchronization pattern, processing the payload; otherwise, discarding the burst.

15. The method of claim 14 wherein the operating mode is based on the expectation of one of an inbound channel, outbound channel, forward channel, reverse channel, subscriber transmission, base station transmission, repeated transmission, and non-repeated transmission.

16. In a wireless communication system with an air interface, a method comprising the steps of:
receiving a burst comprising a payload and a field embedded within the burst;
determining whether the field is one of a synchronization field and a signaling field wherein the synchronization field comprises a synchronization pattern; and
when the field is determined to be the synchronization field:
identifying a position of at least one subsequent burst comprising the signaling field;
identifying at least one subsequent burst comprising the synchronization field;
comparing the received synchronization pattern against a first known synchronization pattern and a second known synchronization pattern, wherein the first and second known synchronization patterns have a common length;
if the received synchronization pattern matches the first known synchronization pattern, selecting a first operating mode; and
if the received synchronization pattern matches the second known synchronization pattern, selecting a second operating mode.

17. The method of claim 16 wherein the first known synchronization pattern is defined by a synchronization pattern defined in ANSI.102.BAAA (2003).

18. In a wireless communication system with an air interface, a method comprising:
receiving a plurality of bursts comprising a superframe, wherein each burst comprises a field embedded within a fixed location in the burst, the field is one of a synchronization field and a signaling field, the field is the synchronization field in a first burst of the plurality of bursts in the superframe and the field is the signaling field in a remainder of the plurality of bursts in the superframe;
for each burst in the superframe, determining whether the field is the synchronization field or the signaling field;
when the field is the synchronization field, defining a position of at least one subsequent burst comprising the signaling field, and defining a position of at least one subsequent burst comprising a synchronization field; and
when the field is the signaling field, defining an indicator in a framing portion of the signaling field to identify that payload in the burst is one of a) begins a new packet, b) completes a packet, c) does not begin or complete a packet and d) identifies a second type of information.

19. In a wireless communication system with an air interface, a method comprising:
receiving a plurality of bursts, wherein each burst comprises a field embedded within a fixed location in the burst, and the field is used in at least one burst as a synchronization field and in at least one other burst as a signaling field, but not simultaneously as both the synchronization field and the signaling field in any single burst;
for each burst in the plurality of bursts, determining whether the field is the synchronization field or the signaling field;
when the field is the synchronization field, defining a position of at least one subsequent burst comprising the signaling field, and defining a position of at least one subsequent burst comprising the synchronization field; and
when the field is the signaling field, defining an indicator to identify that payload in the burst either a) begins a new packet, completes a packet, or signals a segment of a packet that does not begin or complete a packet or b) identifies a second type of information.

* * * * *